(12) United States Patent
Lore et al.

(10) Patent No.: US 12,614,306 B2
(45) Date of Patent: Apr. 28, 2026

(54) INVERTING NEURAL RADIANCE FIELDS FOR PART AND SCENE POSE ESTIMATION

(71) Applicant: RTX Corporation, Farmington, CT (US)

(72) Inventors: Kin Gwn Lore, Belmont, MA (US); Ganesh Sundaramoorthi, Duluth, GA (US); Xinhua Zhang, Weatogue, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/333,471

(22) Filed: Jun. 12, 2023

(65) Prior Publication Data

US 2024/0412409 A1     Dec. 12, 2024

(51) Int. Cl.
*G06T 7/73* (2017.01)
*G06N 3/06* (2006.01)
(Continued)

(52) U.S. Cl.
CPC ................. *G06T 7/75* (2017.01); *G06N 3/06* (2013.01); *G06N 3/084* (2013.01); *G06N 20/00* (2019.01);
(Continued)

(58) Field of Classification Search
None
See application file for complete search history.

(56) References Cited

U.S. PATENT DOCUMENTS 12,394,166 B2 * 8/2025 Gori ........................ G06T 15/00
2022/0398806 A1  12/2022 Arksey et al.
(Continued)

FOREIGN PATENT DOCUMENTS

WO        2022104178 A1    5/2022
WO    WO-2024123989 A1 *  6/2024
(Continued)

OTHER PUBLICATIONS

Extended European Search Report for EP Application No. 24181675.0, dated Oct. 25, 2024, pp. 1-11.
(Continued)

*Primary Examiner* — Tyler W. Sullivan
(74) *Attorney, Agent, or Firm* — CANTOR COLBURN LLP

(57)        ABSTRACT

A method for generating an application specific pose estimation responsive to a camera pose, a scene pose and an object pose includes generating an observed image ($I_{obs}$) of an object and a scene using a camera and generating a current pose estimate having an object image render and a scene image render. The method further includes generating a final rendered output ($I_{mdr}$) by combining the object image render and the scene image render and processing the final rendered output ($I_{mdr}$) and the observed image ($I_{obs}$) to generate a final pose estimate, wherein the final pose estimate matches the observed image ($I_{obs}$).

17 Claims, 2 Drawing Sheets

(51) Int. Cl.
| | |
|---|---|
| *G06N 3/084* | (2023.01) |
| *G06N 20/00* | (2019.01) |
| *G06T 7/11* | (2017.01) |
| *G06T 19/00* | (2011.01) |

(52) U.S. Cl.
CPC .............. *G06T 7/11* (2017.01); *G06T 19/006* (2013.01); *G06T 2207/30244* (2013.01)

(56) References Cited

U.S. PATENT DOCUMENTS

| | | | | |
|---|---|---|---|---|
| 2023/0230275 | A1* | 7/2023 | Lin | G06T 7/70 |
| | | | | 382/103 |
| 2023/0281913 | A1* | 9/2023 | Rematas | G06T 7/55 |
| | | | | 345/419 |
| 2023/0410339 | A1* | 12/2023 | Sawarkar | G06N 3/0895 |
| 2024/0005598 | A1* | 1/2024 | Sucar | G06T 7/70 |
| 2024/0273811 | A1* | 8/2024 | Radwan | G06T 15/205 |
| 2024/0312123 | A1* | 9/2024 | Anwar | G06T 19/006 |

FOREIGN PATENT DOCUMENTS

| | | | | | |
|---|---|---|---|---|---|
| WO | WO-2024129646 | A1 * | 6/2024 | ............. | G06T 17/00 |
| WO | WO-2024163018 | A1 * | 8/2024 | ............. | H04N 7/157 |

OTHER PUBLICATIONS

Lin et al., "BARF: Bundle-Adjusting Neural Radiance Fields", arxiv.org, Cornell University Library, Aug. 19, 2021, XP091024204, pp. 5741-5751.

Stelzner et al., "Decomposing 3D Scenes into Objects via Unsupervised Volume Segmentation", arxiv.org, Cornell University Library, Apr. 2, 2021, XP081931740, pp. 1-15.

Yen-Chen et al., "iNeRF: Inverting Neural Radiance Fields for Pose Estimation", arxiv.org, Cornell University Ithaca, NY 14853, Dec. 10, 2020, XP081834080, pp. 1-12.

Yen-Chen, Lin, "iNeRF: Inverting Neural Radiance Fields for Pose Estimation", Dec. 8, 2020, XP093214193, retrieved from the Internet: https://www.youtube.com/watch?v=eQuCZaQNOtl&ab_channel= Yen-ChenLin, pp. 1-2.

Schonberger et al., "Structure-from-Motion Revisited", Proceedings of the IEEE Conference on Computer Vision and Pattern Recognition, 2016, pp. 4104-4113.

Wei et al., "DeepSFM: Structure From Motion via Deep Bundle Adjustment", European Conference on Computer Vision, 2020, pp. 1-29.

* cited by examiner

INVERTING NEURAL RADIANCE FIELDS FOR PART AND SCENE POSE ESTIMATION

BACKGROUND

Neural Radiance Fields (NeRFs) is a technique for generating a 3D representation of an object/scene. NeRF learns this 3D representation of an object/scene from a plurality of 2D images using advanced machine learning. This technique encodes multiple 2D views of an object or scene into an artificial neural network, where, given viewpoint parameters as input, it can predict the light intensity, or radiance, at any point along imaginary rays emitted from the view point position. This allows for the generation of realistic images of the object or scene from different angles and positions. Essentially, from the limited set of multi-view images the NeRF learns how an object would look like if a camera pose were supplied. The iNeRF is actually repeatedly applying NeRF given a camera pose, and then generates renders for that given pose. The iNeRF will continue comparing the render with an actual observation and updating the pose estimate to try to minimize the error. Thus, understanding the pose of a moving camera (6DoF, including translational and rotational motions) in the scene, or the pose of an object part, is essential for better situational awareness. Many existing pose estimation frameworks require large amount of labeled training data, such as through large scale labeling of key points on images for use in supervised training (e.g., deep learning).

Unfortunately, however, while unsupervised pose estimation exists, its success has been limited to a certain extent, such as fitting a silhouette of CAD model of an object/scene/assembly over the segmented objects and scenes of interest. This is not always feasible when the scene is cluttered and subject to many environmental variations such as illumination, transient objects, and noise. In particularly for smart factory applications, part geometries are highly specialized and typically nonstandard (i.e., not common objects as simple as tables, chairs, etc.) which makes using off-the-shelf pose-estimation pretrained networks difficult (nontransferable weights, as well as lack of training datasets), if not impossible.

BRIEF DESCRIPTION

Disclosed is a method for generating an application specific pose estimation responsive to a camera pose, a scene pose and an object pose includes generating an observed image ($I_{obs}$) of an object and a scene using a camera, processing the observed image to generate a current pose estimate having an object image and a scene image, processing the current pose estimate to, generate an object render by applying the object image to a specialized NeRF, and generate a scene render by applying the scene image to a specialized NeRF. The method further includes generating a final rendered output ($I_{rndr}$) by combining the object render and the scene render, generating a final pose estimate, wherein generating a final pose estimate includes, comparing the observed image ($I_{obs}$) with the final rendered output ($I_{rndr}$) to obtain a loss metric, backpropagating the loss metric to update the current pose estimate, and repeating the generating a final pose estimate until the final rendered output ($I_{rndr}$) matches the observed image ($I_{obs}$).

In addition to one or more of the features described above, or as an alternative to any of the foregoing embodiments, generating an object image includes operating a moving camera to generate an image of a stationary object from at least one predefined angle relative to a position of the object.

In addition to one or more of the features described above, or as an alternative to any of the foregoing embodiments, generating an object image includes operating a stationary camera to generate an image of a moving object from at least one predefined angle relative to a position of the object.

In addition to one or more of the features described above, or as an alternative to any of the foregoing embodiments, processing the observed image includes segmenting the observed image using a 2D segmentation technique to isolate and obtain the current scene pose and the current object pose from the observed image.

In addition to one or more of the features described above, or as an alternative to any of the foregoing embodiments, generating a final rendered output ($I_{rndr}$) includes compositing the object render and the scene render together using a predetermined compositing technique.

In addition to one or more of the features described above, or as an alternative to any of the foregoing embodiments, generating a final pose estimate includes, comparing the observed image ($I_{obs}$) with the final rendered output ($I_{rndr}$) to obtain a loss metric, wherein the loss metric is responsive to a difference between the observed image ($I_{obs}$) and the final rendered output ($I_{rndr}$).

In addition to one or more of the features described above, or as an alternative to any of the foregoing embodiments, if the loss metric is below a predetermined loss metric threshold, backpropagating the loss metric to update the current pose estimate.

In addition to one or more of the features described above, or as an alternative to any of the foregoing embodiments, if the loss metric is below the predetermined loss metric threshold, repeating the generating a final pose estimate until the loss metric is equal to or greater than the predetermined loss metric threshold.

In addition to one or more of the features described above, or as an alternative to any of the foregoing embodiments, when the loss metric is equal to or greater than the predetermined loss metric threshold, the final rendered output ($I_{rndr}$) matches the observed image ($I_{obs}$) and is determined to be the final pose estimate.

In addition to one or more of the features described above, or as an alternative to any of the foregoing embodiments, generating an object render includes applying the object image to a Bundle-Adjusting Neural Radiance Fields (BARF), and generating a scene render by applying the scene image to a BARF.

Also disclosed is a method for generating an application specific pose estimation responsive to a camera pose, a scene pose and an object pose includes generating an observed image ($I_{obs}$) of an object and a scene using a camera and generating a current pose estimate having an object image render and a scene image render. The method further includes generating a final rendered output ($I_{rndr}$) by combining the object image render and the scene image render and processing the final rendered output ($I_{rndr}$) and the observed image ($I_{obs}$) to generate a final pose estimate, wherein the final pose estimate matches the observed image ($I_{obs}$).

In addition to one or more of the features described above, or as an alternative to any of the foregoing embodiments, generating at least one object image includes at least one of, operating a moving camera to generate an image of a stationary object from at least one predefined angle relative to a position of the at least one object and operating a stationary camera to generate an image of a moving object from at least one predefined angle relative to a position of the at least one object.

In addition to one or more of the features described above, or as an alternative to any of the foregoing embodiments, processing the observed image includes segmenting the observed image using a 2D segmentation technique to isolate and obtain a current scene pose and at least one current object pose from the observed image.

In addition to one or more of the features described above, or as an alternative to any of the foregoing embodiments, generating a current pose estimate includes, generating at least one object render by applying each of the at least one current object pose to a specialized NeRF, and generating a scene render by applying the scene image to a specialized NeRF.

In addition to one or more of the features described above, or as an alternative to any of the foregoing embodiments, generating a final rendered output ($I_{rndr}$) includes compositing the at least one object render and the scene render together using a predetermined compositing technique.

In addition to one or more of the features described above, or as an alternative to any of the foregoing embodiments, generating a final pose estimate includes, comparing the observed image ($I_{obs}$) with the final rendered output ($I_{rndr}$) to obtain a loss metric, wherein the loss metric is responsive to a difference between the observed image ($I_{obs}$) and the final rendered output ($I_{rndr}$).

In addition to one or more of the features described above, or as an alternative to any of the foregoing embodiments, if the loss metric is below a predetermined loss metric threshold, backpropagating the loss metric to update the current pose estimate.

In addition to one or more of the features described above, or as an alternative to any of the foregoing embodiments, if the loss metric is below the predetermined loss metric threshold, repeating the generating a final pose estimate until the loss metric is equal to or greater than the predetermined loss metric threshold.

In addition to one or more of the features described above, or as an alternative to any of the foregoing embodiments, when the loss metric is equal to or greater than the predetermined loss metric threshold, the final rendered output ($I_{rndr}$) matches the observed image ($I_{obs}$) and is determined to be the final pose estimate.

In addition to one or more of the features described above, or as an alternative to any of the foregoing embodiments, generating at least one object render includes applying the at least one object image to a BARF, and generating a scene render by applying the scene image to a BARF.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of illustration and not limitation with reference to the Figures.

In an embodiment, NeRFs may be used for synthesizing novel views of a scene or object given desired/queried camera pose parameters. NeRFs may be trained by capturing multiple images from different viewpoints (e.g., multi-view), in which an artificial neural network learns to synthesize how an object or scene would look like given an arbitrary camera pose completely based on the captured 2D images. By inverting the NeRFs in an iNeRF framework, pose estimation may be performed via an initial pose estimate, which then generates a synthesized view which is compared to the current observation. The error may then be backpropagated to update and refine the pose estimation until convergence of the pose estimation and the observed image is achieved.

In at least one embodiment, the invention contemplates applying Bundle-Adjusting Neural Radiance Fields (BARF) approach for training NeRF from an imperfect (or even unknown) camera pose, where BARF can effectively optimize the neural scene representations and, at the same time, resolve large camera pose misalignment. This may enable view synthesis and localization of image sequences from unknown camera poses and may help with having imperfect ground truth and limited data, so the data requirements don't have to be that high which may make it useful because there is no need to collect data and/or having to get an accurate camera pose to train the NeRF. It should be appreciated that the method of the invention disclosed herein allows for application specific functionality for complex parts, scenes, etc. especially in "smart" factories by using iNeRF for camera pose, scene pose and object pose estimation, as opposed to just object pose estimation. Moreover, the incorporation of BARF as the initial, or forward, NeRF instead of the trained "vanilla" NeRF to address imperfect ground truths may result in a robust method for pose estimation based on real visual images which require no CAD models and no need to consider domain shift.

It should be appreciated that the invention is applicable to a single branch approach (i.e., 1 nerf, no segmentation, only one estimate camera+object+scene pose is rigid) or a multiple branch approach (i.e., multiple NeRFs, segmentation, multiple estimates).

Figure 1:
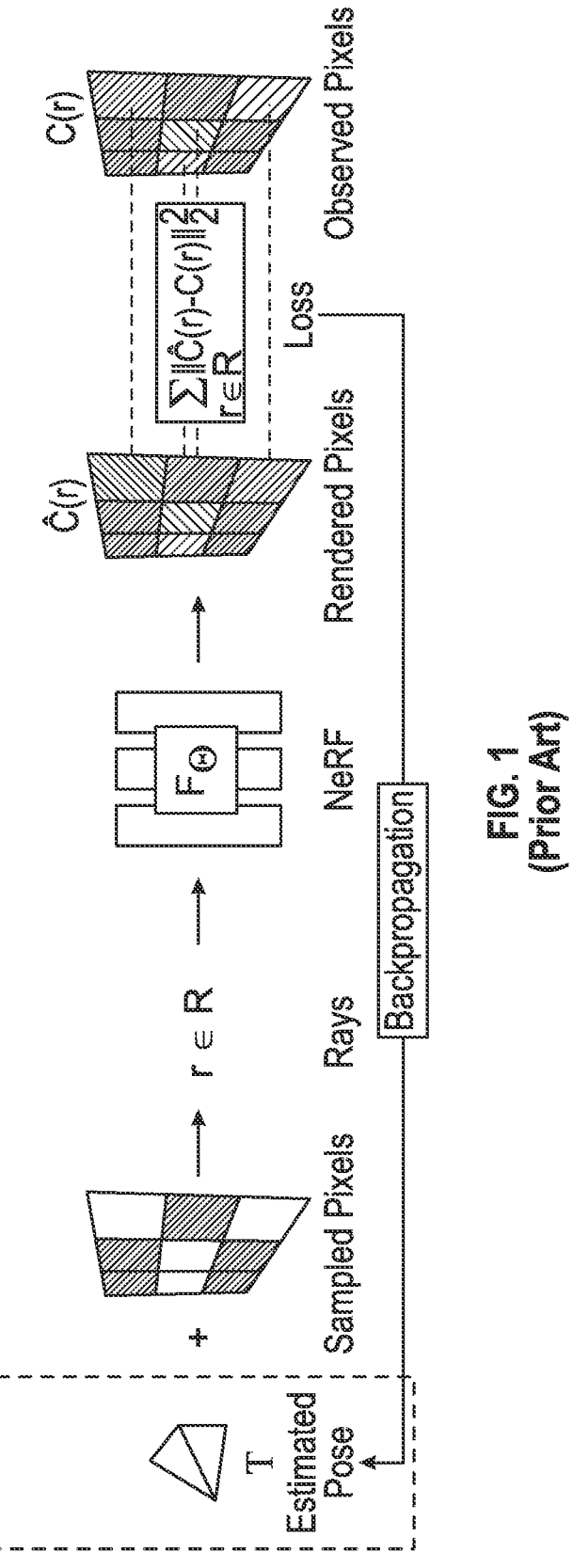
FIG. 1 is a block diagram illustrating the operation of Inverted Neural Radiance Fields (iNeRF), in accordance with the prior art.
Figure 2:
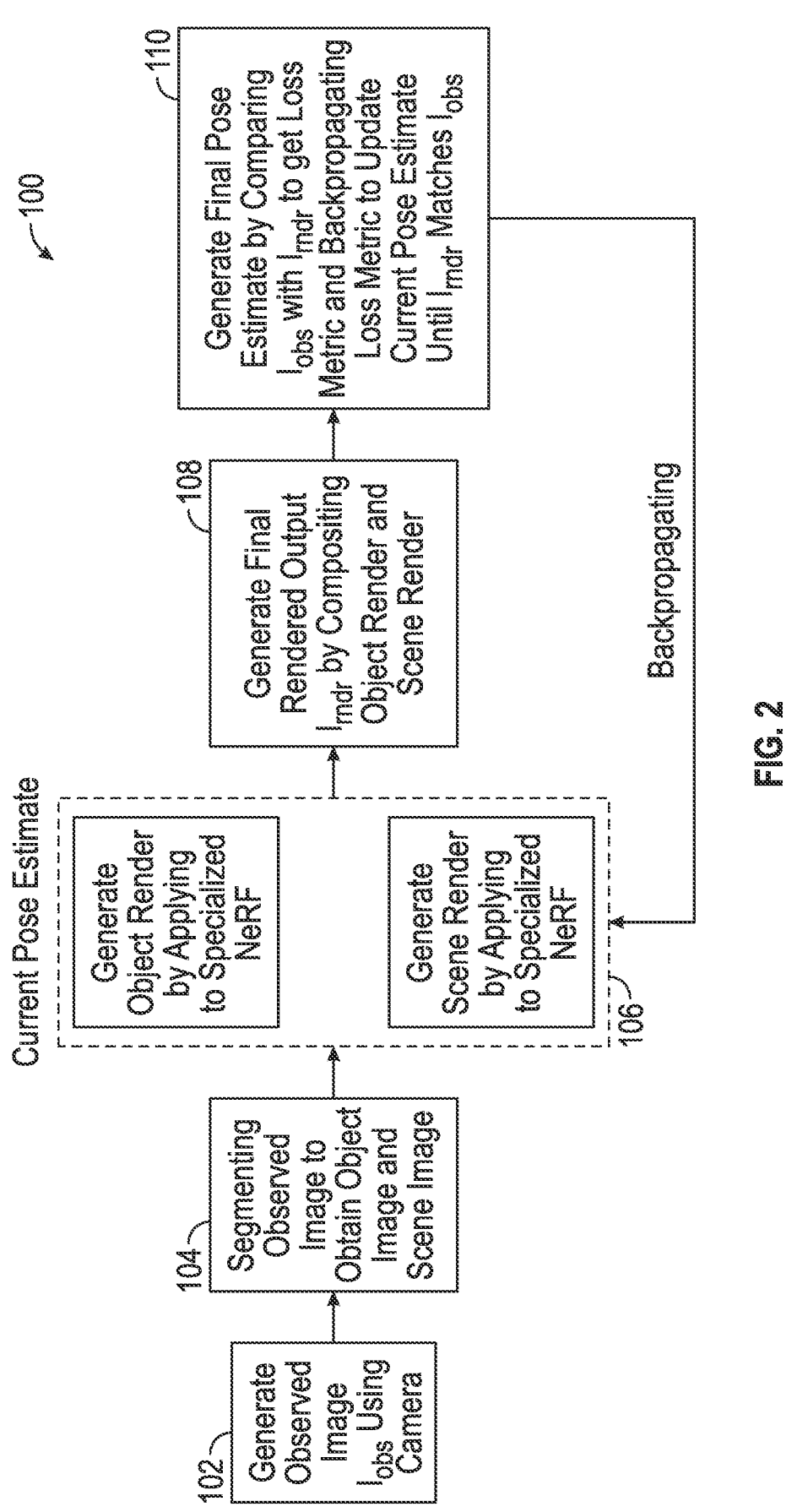
FIG. 2 is an operational block diagram illustrating a method for generating an application specific pose estimation responsive to a camera pose, a scene pose and an object pose, in accordance with an embodiment of the invention.

Referring to FIG. 1 and FIG. 2, a method 100 for generating an application specific pose estimation responsive to a camera pose estimation, object pose estimation and scene pose estimation for a camera, a scene and at least one object is provided, in accordance with an embodiment. The method 100 includes generating an observed image ($I_{obs}$) of the scene and an object, as shown in operational block 102. This may be accomplished using a camera which captures an image of the object/scene from one or more angles. In one embodiment, the camera may be mounted on a robotic arm which moves around a stationary object and takes an image of the object at a predetermined inspection angle. For example, if a blade of a turbo fan is being inspected, the camera may take an image of the blade from a specific inspection angle. It should be appreciated that in another embodiment, the camera may be stationary and the object may be moving. The observed image is processed to generate a scene image and an object image, as shown in operational block 104. This may be accomplished by segmenting the observed image using a 2D segmentation approach to isolate and obtain the current scene (i.e., foreground/background) pose and the current object pose from the observed image.

The current scene pose and the object scene pose are separately fed into specialized NeRFs to generate a scene image rendering and an object image rendering, respectively, as shown in operational block 106. The scene image rendering and the object image rendering are composited to generate a rendered output ($I_{rndr}$) as shown in operational block 108. The final pose estimate is determined by comparing the observed image ($I_{obs}$) with the rendered output ($I_{rndr}$) to determine the loss metric (i.e., the difference between the observed image ($I_{obs}$) and the rendered output ($I_{rndr}$)) and repeatedly backpropagating the loss metric to update the current pose estimate until the observed image ($I_{obs}$) and the rendered output ($I_{rndr}$) converge (i.e., match), as shown in operational block 110. It should be appreciated that the loss metric is a metric that corresponds to a difference between the observed image ($I_{obs}$) and the final rendered output ($I_{rndr}$). In an embodiment, the invention may include a predetermined loss metric threshold, where if the loss metric is below the predetermined loss metric threshold, then the method may include backpropagating the loss metric to update the current pose estimate and repeating the backpropagating until the loss metric is equal to or greater than the predetermined loss metric threshold.

The rendered output ($I_{rndr}$) is the final pose estimate when the rendered output ($I_{rndr}$) matches the observed image ($I_{obs}$). This final pose estimate may then be used to perform application specific functions, such as mapping a defect seen in the image space to a 3D CAD model. It should be appreciated that the method of the invention may be used with other ranges of the electromagnetic spectrum, such as infrared.

It should be appreciated that, although the invention is described hereinabove with regards to only one object, it is contemplated that in other embodiments the invention may be used for multiple objects. Moreover, although the invention is described hereinabove with regards to the camera being movable and the object being stationary (i.e., static), it is contemplated that in other embodiments the camera may be stationary and the object may be movable. Moreover, in an embodiment, the invention may use "multiple branches" and "multiple NeRFs" to achieve better rendering of scene (i.e., foreground/background, multiple objects, different camera pose vs object pose in a scene, etc.) such that multiple estimates are obtained. The invention may be used for application specific tasks involving complex parts, scenes, etc. especially in smart factories.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

In accordance with one or more embodiments, the processing of at least a portion of the method in FIG. 2 may be implemented by a controller/processor disposed internal and/or external to a computing device. In addition, processing of at least a portion of the method in FIG. 2 may be implemented through a controller/processor operating in response to a computer program. In order to perform the prescribed functions and desired processing, as well as the computations therefore (e.g. execution control algorithm(s), the control processes prescribed herein, and the like), the controller may include, but not be limited to, a processor(s), computer(s), memory, storage, register(s), timing, interrupt (s), communication interface(s), and input/output signal interface(s), as well as combination comprising at least one of the foregoing.

Additionally, the invention may be embodied in the form of a computer or controller implemented processes. The invention may also be embodied in the form of computer program code containing instructions embodied in tangible media, such as floppy diskettes, CD-ROMs, hard drives, and/or any other computer-readable medium, wherein when the computer program code is loaded into and executed by a computer or controller, the computer or controller becomes an apparatus for practicing the invention. The invention can also be embodied in the form of computer program code, for example, whether stored in a storage medium, loaded into and/or executed by a computer or controller, or transmitted over some transmission medium, such as over electrical wiring or cabling, through fiber optics, or via electromagnetic radiation, wherein when the computer program code is loaded into and executed by a computer or a controller, the computer or controller becomes an apparatus for practicing the invention. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire When implemented on a general-purpose microprocessor the computer program code segments may configure the microprocessor to create specific logic circuits.

Additionally, the processor may be part of a computing system that is configured to or adaptable to implement machine learning models which may include artificial neural networks, such as deep neural networks, convolutional neural networks, recurrent neural networks, vision transformers, encoders, decoders, or any other type of machine learning model. The machine learning models can be trained in a supervised, unsupervised, or hybrid manner.

While the present disclosure has been described with reference to an exemplary embodiment or embodiments, it will be understood by those skilled in the art that various changes may be made and equivalents may be substituted for elements thereof without departing from the scope of the present disclosure. Moreover, the embodiments or parts of the embodiments may be combined in whole or in part without departing from the scope of the invention. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this disclosure, but that the present disclosure will include all embodiments falling within the scope of the claims.

What is claimed is:

1. A method that generates an application specific pose estimation responsive to a camera pose, a scene pose and an object pose, the method comprising:

generating an observed image (Iobs) of an object and a scene using a camera;

processing the observed image to generate a current pose estimate having a current object pose and a current scene pose, the processing including segmenting the observed image using a 2D segmentation technique to obtain from the observed image a first segmented component representing a scene image of the current scene pose and a second segmented component representing an object image representing the current object pose that is an isolated from the first segmented component;

processing the current pose estimate to, generate an object render by applying the object image to a first Neural Radiance Field (NeRF), and generate a scene render by applying, independently from the object image, the scene image to a second NeRF that is different from the first NeRF;

generating a final rendered output (Irndr) by combining the object render and the scene render;

generating a final pose estimate, wherein generating a final pose estimate includes, comparing the observed image (Iobs) with the final rendered output (Irndr) to obtain a loss metric, backpropagating the loss metric to update the current pose estimate, and repeating the generating a final pose estimate until the loss metric is equal or greater than a loss metric threshold such that the final rendered output (Irndr) matches the observed image (Iobs), wherein the object render and the scene render are generated independently based on the segmented components, and wherein the object render and the scene render are composited to generate the final rendered output (Irndr).

2. The method of claim 1, wherein generating an object image includes operating a moving camera to generate an image of a stationary object from at least one predefined angle relative to a position of the object.

3. The method of claim 1, wherein generating an object image includes operating a stationary camera to generate an image of a moving object from at least one predefined angle relative to a position of the object.

4. The method of claim 1, wherein generating a final rendered output (Irndr) includes compositing the object render and the scene render together using a predetermined compositing technique.

5. The method of claim 1, wherein generating a final pose estimate includes, comparing the observed image (Iobs) with the final rendered output (Irndr) to obtain a loss metric, wherein the loss metric is responsive to a difference between the observed image (Iobs) and the final rendered output (Irndr).

6. The method of claim 5, wherein in response to the loss metric being below the predetermined loss metric threshold, backpropagating the loss metric to update the current pose estimate until the loss metric is equal or greater than the loss metric threshold.

7. The method of claim 6, wherein in response to the loss metric being below the predetermined loss metric threshold, repeating the generating a final pose estimate until the loss metric is equal to or greater than the predetermined loss metric threshold.

8. The method of claim 7, wherein in response to the loss metric being equal to or greater than the predetermined loss metric threshold, the final rendered output (Irndr) matches the observed image (Iobs) and is determined to be the final pose estimate.

9. The method of claim 1, wherein generating an object render includes applying the object image to a Bundle-Adjusting Neural Radiance Fields (BARF), and generating a scene render by applying the scene image to a BARF.

10. A method that generates an application specific pose estimation responsive to a camera pose, a scene pose and at least one object pose, the method comprising:

generating an observed image (Iobs) of at least one object and a scene using a camera;

processing the observed image to generate a current pose estimate having a current object pose and a current scene pose, the processing including segmenting the observed image using a 2D segmentation technique to obtain from the observed image a first segmented component representing a scene image of the current scene pose and a second segmented component representing an object image representing the current object pose that is an isolated from the first segmented component:

generating an object render by applying an-the object image to a first Neural Radiance Field (NeRF), and generating a scene render by applying, independently from the object image, the scene image to a second NeRF that is different from the first NeRF;

generating a final rendered output (Irndr) by combining the a object render and the scene render;

comparing the observed image (Iobs) with the final rendered output (Irndr) to obtain a loss metric, wherein the loss metric is responsive to a difference between the observed image (Iobs) and the final rendered output (Irndr);

processing the final rendered output (Irndr) and the observed image (Iobs) to generate a final pose estimate, wherein the final pose estimate matches the observed image (Iobs) when the loss metric is equal or greater than a loss metric threshold, wherein the object render and the scene render are generated independently based on the segmented components, and wherein the object render and the scene render are composited to generate the final rendered output (Irndr).

11. The method of claim 10, wherein generating the object image includes at least one of, operating a moving camera to generate an image of a stationary object from at least one predefined angle relative to a position of the at least one object, and operating a stationary camera to generate an image of a moving object from at least one predefined angle relative to a position of the at least one object.

12. The method of claim 10, wherein processing the observed image includes segmenting the observed image using a 2D segmentation technique to isolate and obtain a current scene pose and at least one current object pose from the observed image to obtain the segmented components.

13. The method of claim 10, wherein generating a final rendered output (Irndr) includes compositing the at least one object render and the scene render together using a predetermined compositing technique.

14. The method of claim 10, wherein in response to the loss metric is below a predetermined loss metric threshold, backpropagating the loss metric to update the current pose estimate until the loss metric is equal or greater than the loss metric threshold.

15. The method of claim 14, wherein in response to the loss metric is below the predetermined loss metric threshold, repeating the generating a final pose estimate until the loss metric is equal to or greater than the predetermined loss metric threshold.

16. The method of claim 15, wherein in response to the loss metric is equal to or greater than the predetermined loss metric threshold, the final rendered output (Irndr) matches the observed image (Iobs) and is determined to be the final pose estimate.

17. The method of claim 10, wherein generating the object render includes applying the at least one object image to a Bundle-Adjusting Neural Radiance Fields (BARF), and generating a scene render by applying the scene image to a BARF.

\*  \*  \*  \*  \*